US010997737B2

(12) United States Patent
Geva et al.

(10) Patent No.: US 10,997,737 B2
(45) Date of Patent: May 4, 2021

(54) METHOD AND SYSTEM FOR ALIGNING IMAGE DATA FROM A VEHICLE CAMERA

(71) Applicant: GM GLOBAL TECHNOLOGY OPERATIONS LLC, Detroit, MI (US)

(72) Inventors: Ofer Geva, Haifa (IL); Michael Slutsky, Kfar Saba (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 81 days.

(21) Appl. No.: 16/401,696

(22) Filed: May 2, 2019

(65) Prior Publication Data

US 2020/0349723 A1 Nov. 5, 2020

(51) Int. Cl.
*G06T 7/33* (2017.01)
*G06T 7/73* (2017.01)
*G06T 7/80* (2017.01)
*G06K 9/62* (2006.01)
*G06K 9/20* (2006.01)
*G06K 9/00* (2006.01)

(52) U.S. Cl.
CPC ............ *G06T 7/33* (2017.01); *G06K 9/00791* (2013.01); *G06K 9/2054* (2013.01); *G06K 9/6202* (2013.01); *G06T 7/73* (2017.01); *G06T 7/80* (2017.01); *G06T 2207/30244* (2013.01); *G06T 2207/30252* (2013.01)

(58) Field of Classification Search
CPC ........... G06K 9/00798; G06K 9/00791; G06K 9/00268; G06K 9/4604; G06K 9/2054; G06K 9/6202; G06T 7/73; G06T 2207/30244; G06T 7/85; G06T 2207/30256; G06T 7/80; G06T 7/33
See application file for complete search history.

(56) References Cited

U.S. PATENT DOCUMENTS

| 2014/0184799 | A1* | 7/2014 | Kussel | H04N 17/002 348/148 |
| 2014/0218525 | A1* | 8/2014 | Sellhusen | G06T 7/269 348/148 |
| 2015/0049193 | A1* | 2/2015 | Gupta | G06T 3/4038 348/148 |

(Continued)

*Primary Examiner* — Jingge Wu
(74) *Attorney, Agent, or Firm* — Cantor Colburn LLP

(57) ABSTRACT

A system and method for aligning image data from a vehicle camera is provided. The method includes: obtaining image data from the vehicle camera; obtaining sensor data from vehicle sensor(s); carrying out a yaw/pitch estimation process to obtain yaw/pitch camera alignment information that includes a yaw misalignment estimate and a pitch misalignment estimate, wherein the yaw/pitch estimation process uses the image data and the sensor data to determine three-dimensional points of identified features within frames of the image data; after the yaw/pitch estimation process, carrying out a roll estimation process to obtain roll alignment information that includes a roll misalignment estimate, wherein the roll estimation process includes using the yaw/pitch camera alignment information; and applying camera alignment information to the image data to obtain aligned image data, wherein the camera alignment information includes information based on the yaw/pitch camera alignment information, the roll alignment information, or both.

20 Claims, 6 Drawing Sheets

(56) References Cited

U.S. PATENT DOCUMENTS

| | | | |
|---|---|---|---|
| 2015/0145965 A1* | 5/2015 | Livyatan | H04N 13/239 |
| | | | 348/47 |
| 2015/0161456 A1* | 6/2015 | Chevalley | H04N 17/002 |
| | | | 348/148 |
| 2016/0104047 A1* | 4/2016 | Sibiryakov | G06K 9/00805 |
| | | | 382/103 |
| 2016/0224852 A1* | 8/2016 | Vicente | G06K 9/00268 |
| 2017/0061622 A1* | 3/2017 | Sakano | G06K 9/00744 |
| 2017/0136948 A1* | 5/2017 | Sypitkowski | G06K 9/4671 |
| 2018/0231654 A1 | 8/2018 | Bilik et al. | |
| 2019/0026924 A1* | 1/2019 | Roimela | H04N 5/247 |
| 2019/0120934 A1 | 4/2019 | Slutsky et al. | |

* cited by examiner

METHOD AND SYSTEM FOR ALIGNING IMAGE DATA FROM A VEHICLE CAMERA

INTRODUCTION

The exemplary embodiments described herein generally relate to a system and method for use in a vehicle and, more particularly, to a vehicle image alignment system and method for aligning image data from a vehicle camera.

Vehicles currently come equipped with a variety of sensors and cameras that are mounted on the vehicle, such as a rear-view camera. Due to various factors, such as manufacturing tolerances and impact from forces during vehicle travel, the rear-view camera (and other sensors or cameras) can become misaligned such that images presented may not appear to be correctly oriented or aligned with respect to the vehicle. That is, the camera pose, which is the position and angles of the camera (i.e., yaw, pitch, roll angles), can become skewed or misaligned with respect to the vehicle.

Thus, it may be desirable to provide a vehicle image alignment system and/or method that determines the alignment of the camera so that images, which may be displayed for a user or otherwise used by the vehicle, can be aligned according to the detected camera pose.

SUMMARY

According to one aspect, there is provided a method of aligning image data from a vehicle camera. The method includes: obtaining image data from the vehicle camera installed on a vehicle; obtaining sensor data from one or more vehicle sensors installed on the vehicle; carrying out a yaw/pitch estimation process to obtain yaw/pitch camera alignment information that includes a yaw misalignment estimate and a pitch misalignment estimate, wherein the yaw/pitch estimation process uses the image data and the sensor data to determine three-dimensional points of identified features within two or more image frames of the image data when obtaining the yaw/pitch camera alignment information; after the yaw/pitch estimation process, carrying out a roll estimation process to obtain roll alignment information that includes a roll misalignment estimate, wherein the roll estimation process includes using the yaw/pitch camera alignment information when obtaining the roll alignment information; and applying camera alignment information to the image data to obtain aligned image data, wherein the camera alignment information includes information based on the yaw/pitch camera alignment information, the roll alignment information, or both.

According to various embodiments, the method may further include any one of the following features or any technically-feasible combination of some or all of these features:

- determining whether predefined conditions are satisfied before any of the carrying out steps;
- the obtaining image data step further comprises providing the image data to a vehicle video processing module;
- the obtaining sensor data step further comprises providing the sensor data to the vehicle video processing module;
- at least one of the obtaining steps further comprises pre-processing;
- the carrying out steps are performed a plurality of times for each time the applying step is performed;
- obtaining the two or more image frames from a frame buffer, wherein the two or more image frames are defined by a frame window;
- synchronizing the two or more image frames to the sensor data, and wherein a time indicator of the sensor data corresponds to a time indicator of the two or more image frames and/or the frame window;
- the yaw/pitch estimation process includes identifying a plurality of features of a first image frame of the image data and then matching each of the identified features of the first image frame to a corresponding feature of a second image frame of the image data to obtain a plurality of matched features;
- the yaw/pitch estimation process includes determining a relative camera pose based on the plurality of matched features;
- the yaw/pitch estimation process includes determining a three-dimensional location for each of the plurality of matched features by using a triangulation technique;
- the yaw/pitch estimation process includes carrying out the identifying step, the matching step, and the determining step to determine a plurality of relative camera poses;
- the yaw/pitch estimation process includes refining the plurality of relative camera poses using a local bundle adjustment technique;
- the roll estimation process includes constructing a region of interest projection, wherein the region of interest projection is a portion of the image data that corresponds to a region of interest in three-dimensional space, and wherein the region of interest corresponds to a region of the road or ground on which the vehicle is travelling.
- the roll estimation process includes identifying a plurality of features within the region of interest projection of a first image frame of the image data and matching the identified features to corresponding features of a second image frame of the image data to obtain a set of matched road features, wherein an optical flow technique is used to match the identified features of the first image frame and to the corresponding features of the second image frame;
- the roll estimation process includes filtering the set of matched road features, wherein the set of matched road features is filtered based on vehicle trajectory information, epipolar constraints, and/or homography constraints to obtain a filtered set of matched road features; and/or
- the roll estimation process includes using a triangulation technique to obtain a three-dimensional point for each of the filtered set of matched road features, and obtaining the roll misalignment estimate based on fitting the three-dimensional points to a ground plane.

According to another aspect, there is provided a method of aligning image data from a vehicle camera. The method includes: obtaining image data from the vehicle camera installed on a vehicle; obtaining sensor data from one or more vehicle sensors installed on the vehicle; carrying out a yaw/pitch estimation process to obtain a yaw misalignment estimate and a pitch misalignment estimate, wherein the yaw/pitch estimation process includes: (i) identifying a plurality of features of a first image frame of the image data and then matching each of the identified features of the first image frame to a corresponding feature of a second image frame of the image data to obtain a plurality of matched features; (ii) determining a three-dimensional location for each of the plurality of matched features by using a triangulation technique; (iii) using a three-dimensional to two-dimensional (3D-to-2D) projection mapping technique to determine a relative camera pose based on the three-dimensional locations; (iv) carrying out the identifying, determining, and using steps a plurality times to obtain a set of relative camera poses; and (v) determining the yaw misalignment estimate and the pitch misalignment estimate based on the set of relative camera poses and the sensor data; after the yaw/pitch estimation process, carrying out a roll estimation process to obtain a roll misalignment estimate; and applying camera alignment information to the image data to obtain aligned image data, wherein the camera alignment information includes the yaw misalignment estimate, the pitch misalignment estimate, and the roll misalignment estimate.

According to various embodiments, the roll estimation process includes: constructing a region of interest projection, wherein the region of interest projection is a portion of the image data that corresponds to a region of interest in three-dimensional space, and wherein the region of interest corresponds to a region of the road or ground on which the vehicle is travelling; identifying a second plurality of features within the region of interest projection of an image frame and matching the identified features to corresponding features of another image frame to obtain a set of matched road features; and filtering the set of matched road features, wherein the set of matched road features is filtered based on constraints, wherein the constraints are obtained based on the yaw misalignment estimate and the pitch misalignment estimate.

According to one aspect, there is provided a vehicle image alignment system. The vehicle image alignment system includes: a vehicle camera installed on a vehicle; one or more vehicle sensors installed on the vehicle; and a vehicle video processing module that includes a processor and a non-transitory, computer-readable memory accessible by the processor, wherein the non-transitory, computer-readable memory includes computer instructions; wherein when the processor of the vehicle video processing module executes the computer instructions, the vehicle alignment system: obtains image data from the vehicle camera; obtain sensor data from the one or more vehicle sensors; carries out a yaw/pitch estimation process to obtain yaw/pitch camera alignment information that includes a yaw misalignment estimate and a pitch misalignment estimate, wherein the yaw/pitch estimation process uses the image data and the sensor data to determine three-dimensional points of identified features within two or more image frames of the image data when obtaining the yaw/pitch camera alignment information; after the yaw/pitch estimation process, carries out a roll estimation process to obtain roll alignment information that includes a roll misalignment estimate, wherein the roll estimation process includes using the yaw/pitch camera alignment information when obtaining the roll alignment information; and applies camera alignment information to the image data to obtain aligned image data, wherein the camera alignment information includes information based on the yaw/pitch camera alignment information, the roll alignment information, or both.

BRIEF DESCRIPTION OF THE DRAWINGS

One or more embodiments of the disclosure will hereinafter be described in conjunction with the appended drawings, wherein like designations denote like elements, and wherein.

DETAILED DESCRIPTION

Figure 1:
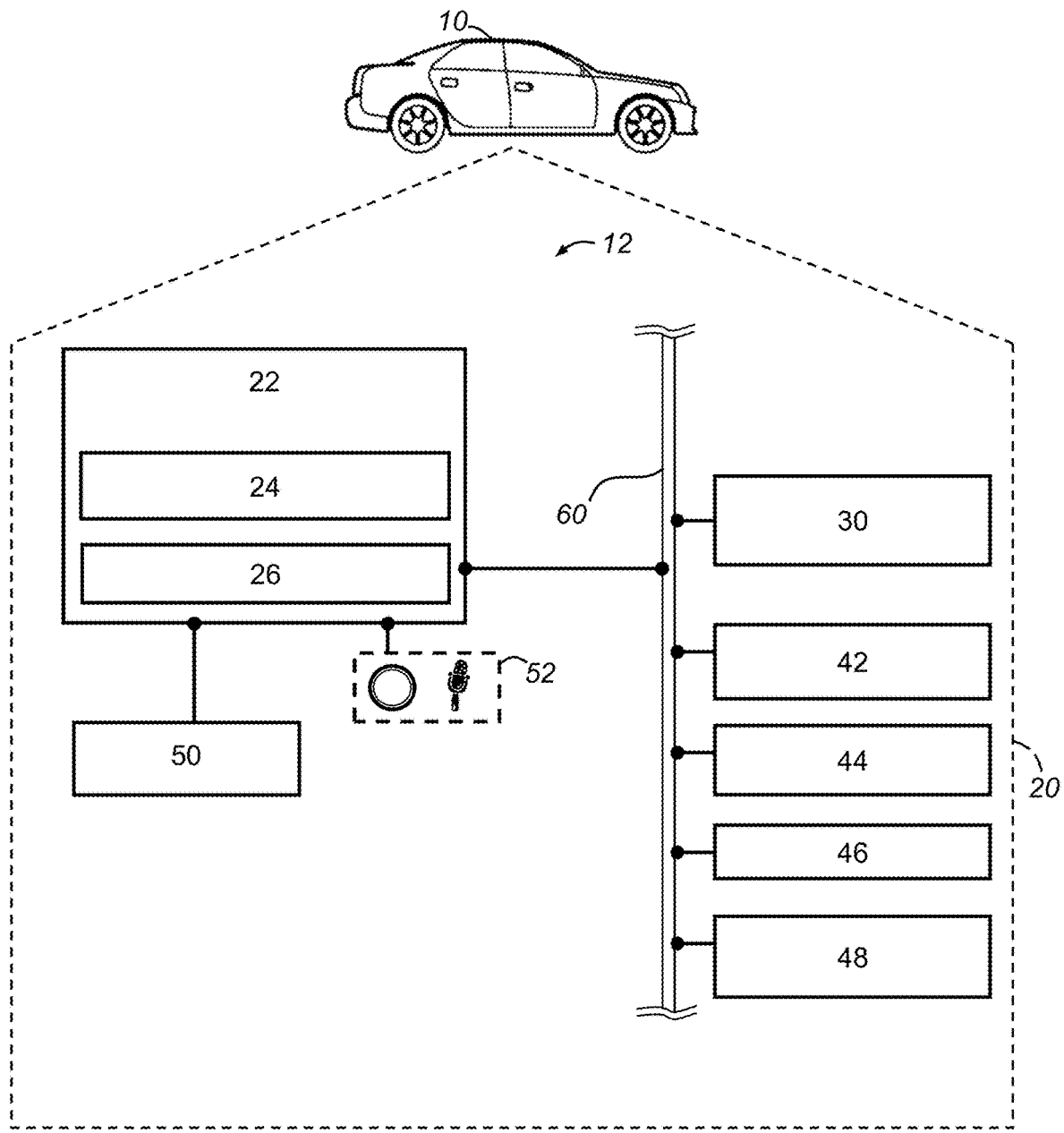
FIG. 1 is a block diagram depicting a vehicle with an embodiment of a vehicle image alignment system that can be used to carry out the method.

The vehicle image alignment system and method calculate misalignment of a vehicle camera in terms of a yaw angle, a pitch angle, and a roll angle, with respect to a vehicle chassis frame of reference (e.g., a center of a rear axle), and then align or calibrate image data in accordance with the calculated misalignment. The vehicle image alignment system and method can include obtaining image data (having a plurality of image frames) and sensor data (e.g., vehicle velocity), and then carrying out a camera alignment estimation process that includes both a yaw/pitch estimation process and a roll estimation process. The yaw/pitch estimation process is used to obtain a yaw misalignment estimate and a pitch misalignment estimate, and the roll estimation process is used to obtain a roll misalignment estimate. The yaw misalignment estimate, the pitch misalignment estimate, and the roll misalignment estimate represent estimates of the misalignment of the camera relative to the vehicle body with respect to the yaw, the pitch, and the roll, respectively. At least according to some embodiments, the roll estimation process includes using information obtained as a part of the yaw/pitch estimation process, which can provide constraints useful in determining an accurate roll angle. The camera alignment estimation process can use Multiview Geometry Techniques, such as visual odometry techniques and/or structure from motion (SfM) techniques, as well as perspective-n-point (PnP) techniques and triangulation techniques. The yaw misalignment estimate, the pitch misalignment estimate, and the roll misalignment estimate, which are examples of camera alignment information, are used to obtain an angular misalignment of the camera pose, which can then be used to rotate and/or otherwise align the image data captured by the camera so that the image data is aligned with respect to the vehicle. It should be appreciated that while the term "camera pose" is generally understood to refer to both the camera's position and the camera's angular disposition, the vehicle image alignment system and method are primarily used for determining an angular misalignment of the camera with respect to the vehicle, and so when the term camera pose is referred to herein, this term may not necessarily be referring to the camera's position or displacement.

In one embodiment, the camera alignment estimation process can be carried out numerous times, such as periodically and/or in response to a command generated by the vehicle user or by a remote facility (e.g., a remote server). Thus, numerous yaw misalignment estimates, pitch misalignment estimates, and roll misalignment estimates can be generated and stored into a yaw/pitch angle estimation history and a roll angle estimation history. Then, a statistical analysis can be carried out on these estimation histories for each of the three angles (i.e., the yaw angle, the pitch angle, and the roll angle) to obtain a representative yaw angle, a representative pitch angle, and a representative roll angle, which are examples of camera alignment information. These representative estimates can then be used to rotate and/or otherwise align the image data captured by the camera.

With reference to FIG. 1, there is shown a vehicle 10 with a non-limiting example of a vehicle image alignment system 12. The vehicle image alignment system 12 can be used to determine camera alignment information that is used to adjust image data obtained by a camera so that the image can be presented to a vehicle user in the correct orientation (or aligned properly) and/or otherwise used by the vehicle. The vehicle image alignment system 12 has vehicle electronics 20 that include a vehicle video processing module 22, a vehicle camera 30, a plurality of vehicle sensors 42-48, a vehicle display 50, and a plurality of vehicle user interfaces 52. The vehicle image alignment system 12 may include other components, devices, units, modules and/or other parts, as the exemplary system 12 is but one example. Skilled artisans will appreciate that the schematic block diagram in FIG. 1 is simply meant to illustrate some of the more relevant hardware components used with the present method and it is not meant to be an exact or exhaustive representation of the vehicle hardware that would typically be found on such a vehicle. Furthermore, the structure or architecture of the vehicle image alignment system 12 may vary substantially from that schematically illustrated in FIG. 1. Thus, because of the countless number of potential arrangements and for the sake of brevity and clarity, the vehicle electronics 20 is described in conjunction with the illustrated embodiment of FIG. 1, but it should be appreciated that the present system and method are not limited to such.

The vehicle 10 is depicted in the illustrated embodiment as a passenger car, but it should be appreciated that any other vehicle including motorcycles, trucks, sports utility vehicles (SUVs), cross-over vehicles, recreational vehicles (RVs), tractor trailers, and even boats and other water- or maritime-vehicles, etc., can also be used. Also, in one embodiment, the vehicle 10 can tow a trailer that includes a rear-view camera (or other camera(s)) that can be used as a part of the system and/or method discussed herein. Portions of the vehicle electronics 20 are shown generally in FIG. 1 and include the vehicle video processing module 22, the vehicle camera 30, the plurality of vehicle sensors 42-48, the vehicle display 50, and the vehicle user interfaces 52. Some or all of the vehicle electronics 20 may be connected for wired or wireless communication with each other via one or more communication busses or networks, such as communications bus 60. The communications bus 60 provides the vehicle electronics 20 with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few. Although most of the components of the vehicle electronics 20 are shown as stand-alone components in FIG. 1, it should be appreciated that components 22, 30, 42, 44, 46, 48, 50 and/or 52 may be integrated, combined and/or otherwise shared with other vehicle components (e.g., the vehicle video processing module 22 could be part of a larger vehicle infotainment or safety system) and are not limited to the schematic representations in that drawing.

Vehicle video processing module 22 is a vehicle module or unit that is designed to receive image data from the vehicle camera 30, and to carry out a camera alignment estimation process to obtain camera alignment information that can be used to adjust the image data so that it is correctly aligned and/or oriented. According to one example, the vehicle video processing module 22 includes a processor 24 and memory 26, where the processor is configured to execute computer instructions that carry out one or more step(s) of the method discussed below. The computer instructions can be embodied in one or more computer programs or products that are stored in memory 26, in other memory devices of the vehicle electronics 20, or in a combination thereof. In one embodiment, the vehicle video processing module 22 includes a graphics processing unit (GPU), a graphics accelerator and/or a graphics card. In other embodiments, the vehicle video processing module 22 includes multiple processors, including one or more general purpose processor(s) or central processing unit(s), as well as one or more GPU(s), graphics accelerator(s) and/or graphics card(s). The vehicle video processing module 22 may be directly coupled (as shown) or indirectly coupled (e.g., via communications bus 60) to the vehicle display 50 and/or other vehicle user interfaces 52.

In one embodiment, the vehicle camera 30 is a rear-view camera that is mounted in a manner so that it faces an area behind the vehicle and is configured to provide the vehicle electronics with image data that can be displayed for viewing by a vehicle user and/or used by the vehicle for acquiring information pertaining to the area behind the vehicle (or within the field of view of the camera), which can be used for autonomous vehicle (AV) functionality, for example. In other embodiments, the vehicle camera 30 can be or include a forward-view camera that faces an area in front of the vehicle, a side-view camera that faces an area to the side of the vehicle, etc. Also, in at least some embodiments, the vehicle can include a plurality of cameras.

Each of the cameras, including the vehicle camera 30, can be used to capture images, videos, and/or other information pertaining to the surroundings that is based on light—this information is referred to herein as "image data"—and can be any suitable camera type. Each of the cameras may be a charge coupled device (CCD), a complementary metal oxide semiconductor (CMOS) device and/or some other type of camera device, and may have a suitable lens for its location and purpose. According to one non-limiting example, each of the cameras is a CMOS camera with a fish-eye lens that captures an image having a wide field-of-view (FOV) (e.g., 150°-210°). Each of the cameras may include a processor and/or memory in the camera itself, or have such hardware be part of a larger module or unit. For instance, each of the vehicle cameras may include processing and memory resources, such as a frame grabber that captures individual still frames from an analog video signal or a digital video stream—these still frames are referred to as image frames. In a different example, instead of being included within the individual vehicle cameras, one or more frame grabbers may be part of the vehicle video processing module 22 (e.g., module 22 may include a separate frame grabber for each vehicle camera). The frame grabber(s) can be analog frame grabbers or digital frame grabbers, and may include other types of image processing capabilities as well. Some examples of potential features that may be used with one or more of cameras include: infrared LEDs for night vision; wide angle or fish eye lenses; stereoscopic cameras with or without multiple camera elements; surface mount, flush mount, or side mount cameras; single or multiple cameras;

cameras integrated into tail lights, brake lights, license plate areas, side view mirrors, front grilles, or other components around the vehicle; and wired or wireless cameras, to cite a few possibilities. In one embodiment, depth and/or range information provided by cameras and/or other sensors is used to generate the first-person composite camera view, as will be discussed in more detail below.

Vehicle sensors 42-48 provide the vehicle image alignment system 12 with various types of sensor data that can be used as a part of the camera alignment estimation process. For instance, sensor 42 is a transmission sensor that may be part of a transmission control unit (TCU), an engine control unit (ECU), or some other vehicle device, unit and/or module, or it may be a stand-alone sensor. The transmission sensor 42 determines which gear the vehicle is presently in (e.g., neutral, park, reverse, drive, first gear, second gear, etc.), and provides the vehicle image alignment system 12 with transmission data (a type of sensor data) that is representative of the same. In one embodiment, the transmission sensor 42 sends transmission data to the vehicle video processing unit 22 via the communications bus 60, and the transmission data affects or influences the specific camera view shown to the driver. For instance, if the transmission sensor 42 sends transmission data that indicates the vehicle is in reverse, then an image or video from the vehicle camera 30 can be displayed.

The steering wheel sensor 44 is directly or indirectly coupled to a steering wheel of vehicle 10 (e.g., directly to a steering wheel or to some component in the steering column, etc.) and provides steering wheel data (a type of sensor data) to the vehicle image alignment system and method. Steering wheel data is representative of the state or condition of the steering wheel (e.g., steering wheel data may represent a steering wheel angle, an angle of one or more vehicle wheels with respect to a longitudinal axis of vehicle, a rate of change of such angles, or some other steering related parameter). In one example, the steering wheel sensor 44 sends steering wheel data to the vehicle video processing module 22 via the communications bus 60, and the steering wheel data can be used to indicate that the vehicle is turning, which can be used in some embodiments of the roll estimation process (specifically, a turn-based roll angle estimation technique) to determine the roll angle of the vehicle camera 30.

Speed sensor 46 is a type of movement sensor and determines a speed, velocity and/or acceleration of the vehicle and provides such information in the form of speed data (a type of sensor data) to the vehicle image alignment system and method. The speed sensor 46 can include one or more of any number of suitable sensor(s) or component(s) commonly found on the vehicle, such as wheel speed sensors, global navigation satellite system (GNSS) receivers, vehicle speed sensors (VSS) (e.g., a VSS of an anti-lock braking system ABS)), etc. Furthermore, speed sensor 46 may be part of some other vehicle device, unit and/or module, or it may be a stand-alone sensor. In one embodiment, speed sensor 46 sends speed data to the vehicle video processing module 22 via the communications bus 60, where the speed data is used for determining a three-dimensional scale that is used as a part of the yaw/pitch estimation process, and/or other portions of the camera alignment estimation process.

The vehicle 10 can include other movement sensors 48, which can be used to obtain movement or inertial information concerning the vehicle, such as vehicle speed, acceleration (longitudinal and/or lateral), yaw (and yaw rate), pitch, roll, and various other attributes of the vehicle concerning its movement as measured locally through use of onboard vehicle sensors. These other movement sensors 48 can be mounted on the vehicle in a variety of locations, such as within an interior vehicle cabin, on a front or back bumper of the vehicle, and/or on the hood of the vehicle 10. The other movement sensors 48 can be coupled to various other sensors, devices, units, modules and/or systems directly or via communications bus 60. Movement sensor data can be obtained and sent to these other pieces of equipment, including the vehicle video processing module 22.

In one embodiment, the other movement sensors 48 can include one or more inertial sensors that can be used to obtain sensor information concerning the acceleration and the direction of the acceleration of the vehicle and/or other direction and movement (or force) information. The inertial sensors can be a microelectromechanical systems (MEMS) sensor or an accelerometer that obtains inertial information relating to levels of acceleration or braking. Additionally or alternatively, the other movement sensors 48 can include one or more yaw rate sensors that obtain vehicle angular velocity information with respect to a vertical axis of the vehicle. The yaw rate sensors can include gyroscopic mechanisms that can determine the yaw rate and/or the slip angle. Various types of yaw rate sensors can be used, including micromechanical yaw rate sensors and piezoelectric yaw rate sensors.

Vehicle electronics 20 also include a number of vehicle-user interfaces that provide occupants with a way of exchanging information (providing and/or receiving information) with the vehicle image alignment system and method. For instance, the vehicle display 50 and the vehicle user interfaces 52, which can include any combination of pushbuttons, knobs, graphic interfaces, microphones, and audio systems, are examples of vehicle-user interfaces. As used herein, the term "vehicle-user interface" broadly includes any suitable form of electronic device, including both hardware and software, which enables a vehicle user to exchange information or data with the vehicle (e.g., provide information to and/or receive information from).

Display 50 is a type of vehicle-user interface and, in particular, is an electronic visual display that can be used to display various images, video and/or graphics, such as a first-person composite camera view. The display 50 can be a liquid crystal display (LCD), a plasma display, a light-emitting diode (LED) display, an organic LED (OLED) display, or other suitable electronic display, as appreciated by those skilled in the art. The display 50 may also be a touch-screen display that is capable of detecting a touch of a user such that the display acts as both an input and an output device. For example, the display 50 can be a resistive touch-screen, capacitive touch-screen, surface acoustic wave (SAW) touch-screen, an infrared touch-screen, or other suitable touch-screen display known to those skilled in the art. The display 50 can be mounted as a part of an instrument panel, as part of a center display, as part of an infotainment systems, as part of a rear view mirror assembly, as part of a heads-up-display reflected off of the windshield, or as part of some other vehicle device, unit, module, etc. According to a non-limiting example, the display 50 includes a touch screen, is part of a center display located between the driver and front passenger, and is coupled to the vehicle video processing module 22 such that it can receive display data from module 22. The display 50 can be used to present image data obtained from the vehicle camera 30 and/or other vehicle cameras, and can display aligned image data that is generated as a result of applying the camera alignment information to image data obtained by the vehicle camera 30. In one embodiment, the display 50 is a touch-screen display that enables a vehicle user to provide a manual start indication that initiates the camera alignment process.

As mentioned above, the vehicle electronics 20 includes other vehicle user interfaces 52, which can include any combination of hardware and/or software pushbutton(s), knob(s), control(s), microphone(s), audio system(s), graphic interface(s), menu option(s), to name a few. A pushbutton or control can allow manual user input to the vehicle electronics 20 for purposes of providing the user with the ability to control some aspect of the system (e.g., initiate display of image data). An audio system can be used to provide audio output to a user and can be a dedicated, stand-alone system or part of the primary vehicle audio system. One or more microphone(s) can be used to provide audio input to the vehicle electronics 20 for purposes of enabling the driver or other occupant to provide voice commands. For this purpose, it can be connected to an on-board automated voice processing unit utilizing human-machine interface (HMI) technology known in the art and, thus, function as a manual camera view control input. Although the display 50 and the other vehicle-user interfaces 52 are depicted as being directly connected to the vehicle video processing module 22, in other embodiments, these items are indirectly connected to module 22, a part of other devices, units, modules, etc. in the vehicle electronics 20, or are provided according to other arrangements.

According to various embodiments, any one or more of the processors discussed herein (e.g., processor 24, another processor of the video processing module 22 or of the vehicle electronics 20) may be any type of device capable of processing electronic instructions including microprocessors, microcontrollers, host processors, controllers, vehicle communication processors, a General Processing Unit, accelerators, Field Programmable Gated Arrays (FPGA), and Application Specific Integrated Circuits (ASICs), to cite a few possibilities. The processor can execute various types of electronic instructions, such as software and/or firmware programs stored in memory, which enable the module to carry out various functionality. According to various embodiments, any one or more of the memory discussed herein (e.g., memory 26) can be a non-transitory computer-readable medium; these include different types of random-access memory (RAM), including various types of dynamic RAM (DRAM) and static RAM (SRAM)), read-only memory (ROM), solid-state drives (SSDs) (including other solid-state storage such as solid state hybrid drives (SSHDs)), hard disk drives (HDDs), magnetic or optical disc drives, or other suitable computer medium that electronically stores information. Moreover, although certain devices or components of the vehicle electronics 20 may be described as including a processor and/or memory, the processor and/or memory of such devices or components may be shared with other devices or components and/or housed in (or be a part of) other devices or components of the vehicle electronics 20. For instance, any of these processors or memory can be a dedicated processor or memory used only for a particular module or can be shared with other vehicle systems, modules, devices, components, etc.

Figure 2:
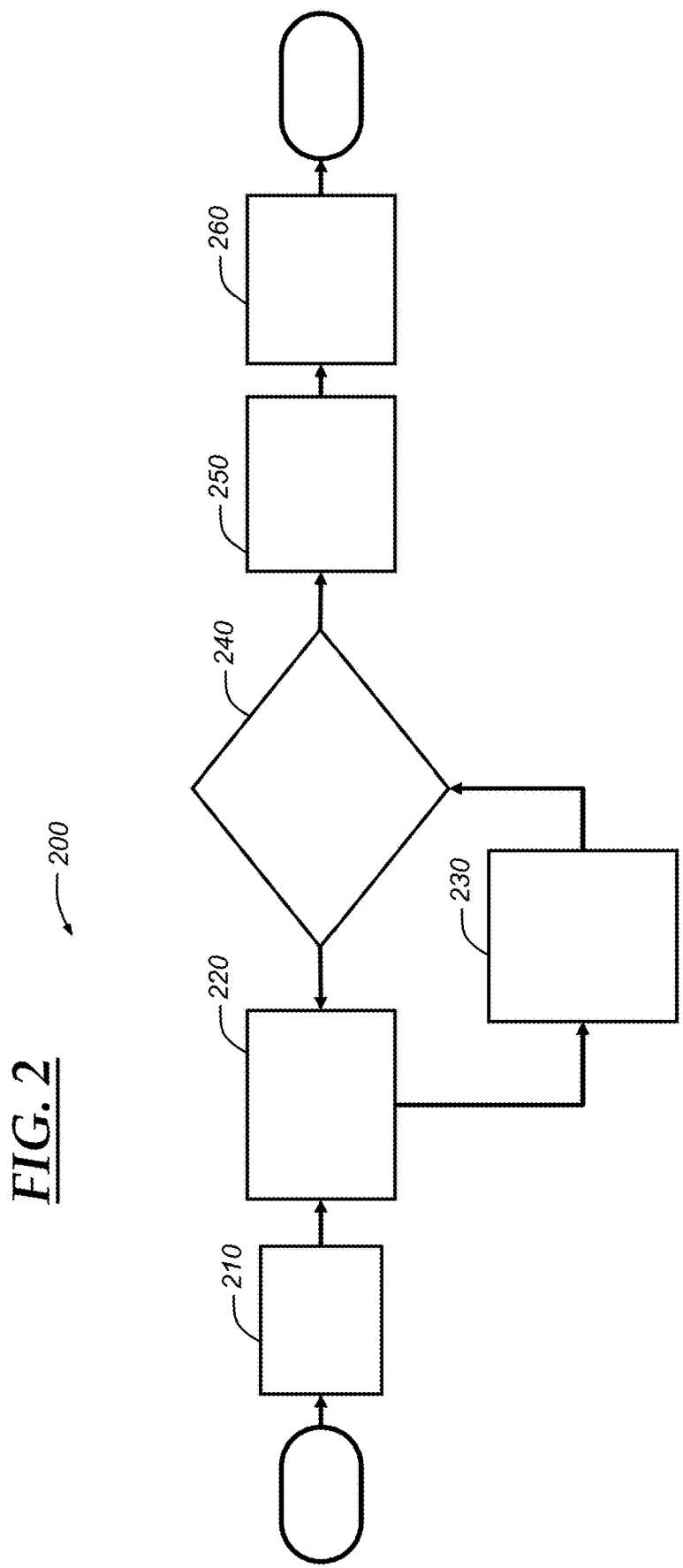
FIG. 2 is a flowchart depicting an embodiment of a method of aligning image data from a vehicle camera.

With reference to FIG. 2, there is shown a flowchart illustrating an embodiment of a method 200 of aligning image data from a vehicle camera. The method 200 may be carried out by the vehicle video processing module 22. However, in other embodiments, one or more steps of the method can be carried out by other portions of the vehicle electronics 20 or a remote device (e.g., a remote server). Although the method 200 is discussed with respect to the vehicle camera 30, it should be appreciated that the method 200 can also be carried out for other vehicle cameras.

The method 200 begins with step 210 wherein an indication to start the method is received, which can be in the form of an "automatic start indication" or a "manual start indication." An automatic start indication is an indication that is generated programmatically in response to certain conditions being met, such as by the vehicle reaching a predetermined mileage. For example, the vehicle video processing module 22 can be programmed to carry out the method 200 in response to a mileage threshold (e.g., every five-thousand (5,000) miles) or in response to a camera performance threshold (e.g., when the vehicle electronics sense or suspect an image misalignment greater than a certain degree). As another example, the vehicle video processing module 22 can receive an indication from a remote server that instructs the vehicle to carry out the method 200. A manual start indication is an indication that is provided by a vehicle user or other individual using one or more vehicle-user interfaces or other human-machine interfaces. For example, the vehicle user can navigate through one or more menus presented on the touch-screen display 50 to select an option that starts the method 200. Other types of vehicle-user interfaces can be used to provide the manual start indication, such as the microphone and/or pushbutton. The method 200 then continues to step 220.

In step 220, it is determined whether one or more predefined conditions of the camera alignment estimation process are satisfied. In at least one embodiment, these predefined conditions indicate that the vehicle is in a proper state for carrying out the camera alignment estimation process (step 230). In one embodiment, the predefined conditions can include certain lighting or other camera-related conditions, vehicle speed or velocity conditions, steering angle or angular velocity conditions, and/or other vehicle operating or sensor conditions. For example, each of these conditions can be assessed by comparing a measured value (e.g., as determined based on sensor data) to one or more threshold values. As an example, the angular velocity can be compared to a maximum threshold value and, when the angular velocity is below the maximum threshold value, it can be determined that the predefined conditions are satisfied. The values of the predefined conditions can be obtained by the vehicle camera 30 and/or the sensors 42-48. When it is determined that the predefined condition(s) are satisfied, then the method 200 proceeds to step 230.

In step 230, the camera alignment estimation process is carried out. With respect to FIG. 3, which will be described in detail below, there is shown an embodiment of a camera alignment estimation process that is carried out to obtain camera alignment information. The camera alignment information includes information concerning the alignment and/or orientation of the yaw angle, the pitch angle, and/or the roll angle, such as the yaw misalignment estimate, the pitch misalignment estimate, and/or the roll misalignment estimate. This camera alignment information can then be used to orient, align, or calibrate image data obtained by the vehicle camera 30. Once the camera alignment information is obtained, the method 200 continues to step 240.

In step 240, it is determined whether the camera alignment information meets predefined quality measures. The predefined quality measures can include determining whether the angle estimations (e.g., the yaw misalignment estimate, the pitch misalignment estimate, the roll misalignment estimate) are within a certain tolerance of a collection of previously-estimated yaw, pitch, and roll angles. This collection of previously-estimated yaw, pitch, and roll angles can be stored in an estimation history, which is discussed more below, and which are previously-determined estimates of the misalignment of the camera with respect to the yaw, pitch, and roll angles. For example, when the camera alignment information reflects a yaw misalignment estimate and a roll misalignment estimate that are statistically-significant outliers from multiple, previously-estimated yaw and roll angles, then it can be determined that the predefined quality measures are not met. When it is determined that the camera alignment information does not meet these quality measures, the method 200 proceeds back to step 220 where the method 200 checks for the predefined conditions. Also, in some embodiments, the step 220 can be carried out after a waiting period (e.g., a predetermined amount of time). When it is determined that the camera alignment information does meet these quality measures, the method 200 proceeds to step 250.

In step 250, the camera alignment information is saved in memory. The camera alignment information can be saved to memory of the vehicle electronics 20, such as the memory 26 of the vehicle video processing module 22. In some embodiments, the camera alignment information can be stored in memory of a particular camera that it pertains to, such as the vehicle camera 30, or it can be saved offsite (e.g., at a remote server). The method 200 continues to step 260.

In step 260, the camera alignment information is used to align image data obtained from the camera. This step can be carried out immediately after the camera alignment information is obtained, or may be carried out at other times. In at least some embodiments, the steps 210-250 are carried out periodically and not necessarily each time image data is captured by the vehicle camera 30. Thus, step 260 can actually be carried out at a later time, and various events can occur between step 250 and 260, such as an ignition cycle (i.e., an ignition off-on cycle), etc. The camera alignment information can be recalled by the vehicle video processing module 22 (or other component of the vehicle electronics 20 (e.g., vehicle camera 30)) and used to align image data obtained from the vehicle camera 30, which can include rotating, skewing, distorting, or otherwise transforming or adjusting certain portions of the image data. The method 200 may then end.

Figure 3:
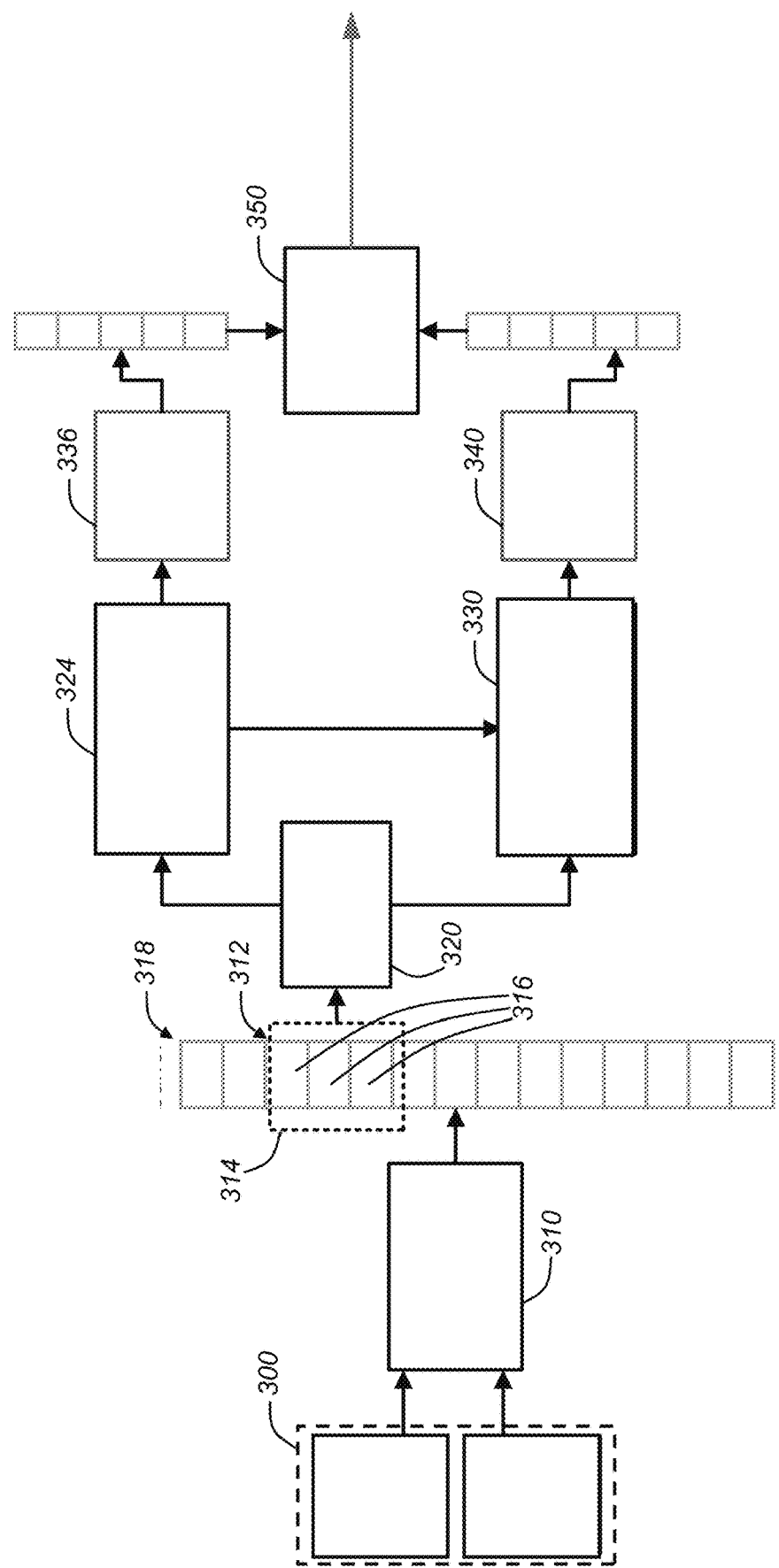
FIG. 3 is a flowchart depicting an embodiment of a camera alignment estimation process that can be carried out as a part of the method of FIG. 2.

With reference to FIG. 3, there is shown a non-limiting example of the camera alignment estimation process of step 230. The camera alignment estimation process 230 may be carried out by the vehicle video processing module 22; however, in other embodiments, another portion of the vehicle electronics 20 and/or a remote device can perform the camera alignment estimation process 230.

Figure 4:
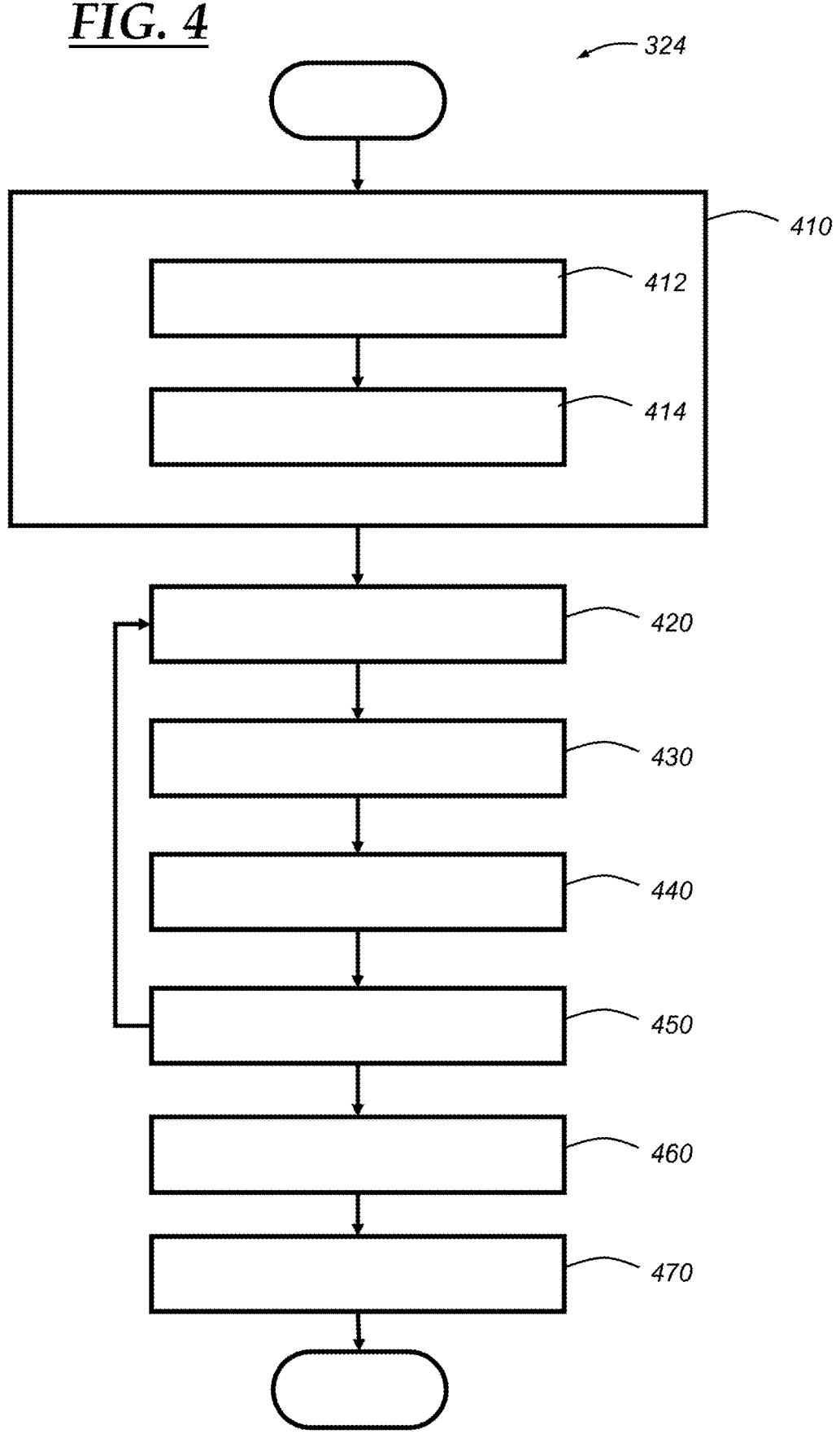
FIG. 4 is a flowchart depicting an embodiment of a yaw/pitch estimation process that can be carried out as a part of the camera alignment estimation process of FIG. 3.
Figure 5:
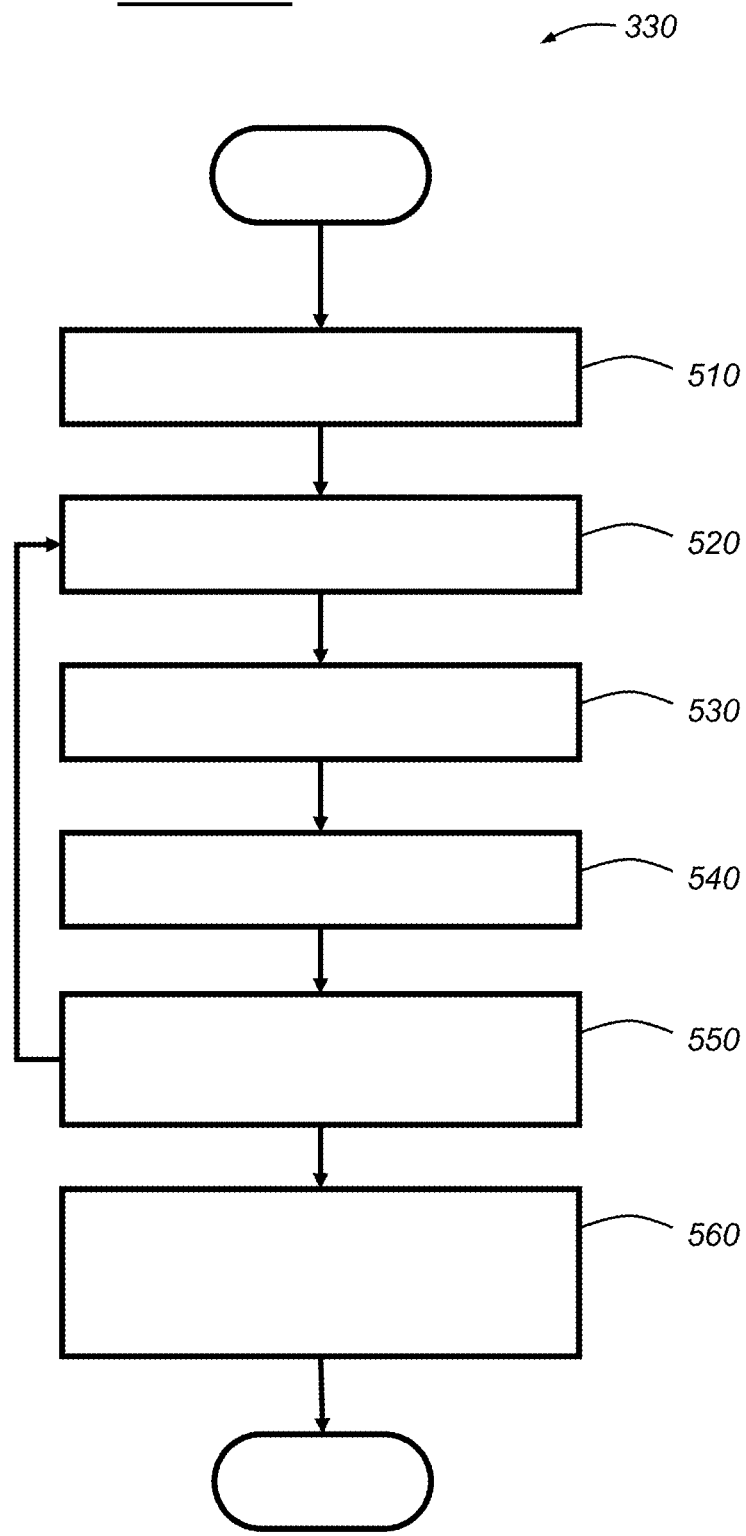
FIG. 5 is a flowchart depicting an embodiment of a roll estimation process that can be carried out as a part of the camera alignment estimation process of FIG. 3.

The camera alignment estimation process 230 begins with step 300, wherein image data and sensor data is obtained. The image data may be obtained by the vehicle camera 30 and provided to the vehicle video processing module 22. The sensor data can include speed data, other movement data, steering wheel data, and/or transmission data and may be obtained by sensors 46, 48, 44, and 42, respectively, and provided to the vehicle video processing module 22. In general, the speed data, which can include speed, velocity, and/or acceleration of the vehicle, can be used to determine the three-dimensional scale used as a part of the yaw/pitch estimation process (FIG. 4). The transmission data can indicate the direction that the vehicle is travelling (e.g., forward, reverse) and the steering wheel data can be used to provide a turn rate of the vehicle, which can be used as a part of the roll estimation process (FIG. 5). The process 230 continues to step 310.

In step 310, the image data is preprocessed. In one embodiment, the camera that captured the image data can perform preprocessing on the image data, which can include sampling the image data at a particular sampling rate, as well as carrying out other preprocessing techniques known to those skilled in the art. Additionally, in some embodiments, the sensor data can also be preprocessed by the sensor that captured the image data, which can include sampling the sensor data, as well as carrying out other preprocessing techniques known to those skilled in the art. In one embodiment, this step can include using the vehicle video processing module 22 (or other portion of the vehicle electronics 20) to perform the preprocessing of the image data and/or the sensor data. The process 230 then continues to step 312.

In at least one embodiment, the steps 312-340 can be carried out numerous times to generate a plurality of each of the following: a yaw angle estimation, a pitch misalignment estimate, and a roll misalignment estimate. The image frames of a certain frame window (explained below) may be used for each iteration of the steps 312-340 and, after each iteration (e.g., after steps 336/340), the process 230 can continue back to step 312. Also, in at least one embodiment, steps 300-310 can continuously be carried out so as to continuously capture image data and sensor data, and then to add such data to a frame buffer and/or a sensor data buffer (or store). The process 230 can end after one or more predefined conditions are met, such as a predetermined number of iterations are carried out. In some embodiments, each iteration can produce camera alignment information (e.g., yaw angle estimation, a pitch misalignment estimate, and/or a roll misalignment estimate) and this information can be evaluated with respect to the quality measures (step 240 of the method 200) to determine whether this information is suitable to be added to the estimation history in steps 336-340, which will be discussed more below.

In step 312, a frame window 314 is selected for use in a first iteration of the yaw/pitch estimation process and/or the roll estimation process. The frame window 314 defines a range of frames 316 within a frame buffer 318 that holds and/or stores a plurality of frames. The process can use the frame buffer 318 for the image data in which each frame of the frame buffer corresponds to a single image 316. The frame window 314 can include a predetermined number of image frames 316, such as three (3) image frames (as shown in the illustrated embodiment) or ten (10) image frames. In a different example, the frame window 314 holds a certain number of frames 316, based on the collective size of the images. The number of image frames 316 in the frame window 314 can be modified according to the particular implementation of the process 230. The frame buffer 318 can be continuously updated to include newly captured image data using steps 300-310. The process 230 then continues to step 320.

In step 320, the sensor data and the image data are synchronized. This synchronization includes obtaining sensor data that corresponds in time to the image data. As mentioned above, the sensor data and the image data can include a time indicator (e.g., a timestamp). This step can then select sensor data having a time indicator that is the same or is the closest (or that otherwise corresponds) in time to the time indicator of the image data of the frame window 314 in question, which can be a time indicator of one or more image frames 316 of the image data. In one embodiment, the frame window 314 can be associated with a particular time indicator, which can be the time indicator of a first frame of the image data, a middle frame of the image data, or a last frame of the image data, for example. The process 230 then continues to step 324.

In step 324, a yaw/pitch estimation process is carried out. An embodiment of a yaw/pitch estimation process 324 is depicted in FIG. 4 and discussed below. Although a particular embodiment of the yaw/pitch estimation process is described herein, in other embodiments, the process 230 can uses various yaw angle and/or pitch angle estimation techniques, including visual odometry techniques, structure from motion (SfM) techniques, etc. Once the yaw/pitch angle estimation information is obtained as a result of the yaw/pitch estimation process, the process 230 continues to step 330 and step 336.

In step 330, a roll estimation process is carried out. An embodiment of a roll estimation process is depicted in FIG. 5 and discussed below. Although a particular embodiment of the roll estimation process is described herein, in other embodiments, the process 230 can uses various roll angle estimation techniques, including road reconstruction techniques, visual odometry techniques, structure from motion (SfM) techniques, etc. As depicted in FIG. 3, the roll estimation process uses input from both step 320 and step 324. The input includes image data and the yaw/pitch angle estimation information. Thus, since the yaw angle and the pitch angle are known (or at least estimated), the roll estimation process can use this information as constraints. Once the roll angle estimation information is obtained as a result of the roll estimation process, the process 230 continues to steps 336.

In steps 336-340, the yaw/pitch angle estimation information (step 336) and the roll angle estimation information (step 340) are stored in memory. Steps 330-340 can be carried out in any suitable order. For example, steps 330 and 336 can be carried out at the same time, and then step 340 can be carried out after step 330. In another embodiment, steps 336 and 340 can be carried out at the same time after steps 324-330 are carried out. The yaw/pitch angle estimation information is stored as a part of a yaw/pitch angle estimation history and the roll angle estimation information is stored as a part of a roll angle estimation history. In some embodiments, the yaw/pitch estimation history can be divided into a yaw angle estimation history and a pitch angle estimation history and stored separately, or all three angles can be stored in a single estimation history. These estimation histories can be stored in memory 26 of the vehicle video processing unit 22, or other memory of the vehicle electronics 20. The process 230 then continues to step 350.

In step 350, a statistical analysis is performed on the yaw/pitch angle estimation history and the roll angle estimation history. Step 350 is depicted as being carried out after steps 336-340. However, the steps 312-340 can be carried out numerous times to obtain numerous instances of yaw/pitch angle estimation information and roll angle estimation information before carrying out step 350. The statistical analysis can be performed separately for the yaw angle estimation history, the pitch angle estimation history, and the roll angle estimation history. Various statistical techniques can be used for performing the statistical analysis. In one embodiment, a mean or average can be calculated based on the estimation history. Additionally or alternatively, a median value can be determined based on the estimation history. In some embodiments, the values used as a part of the statistical analysis can be those estimations (e.g., yaw angle estimation information, pitch angle estimation information, roll angle estimation information) that were obtained within a predetermined amount of time (e.g., within the last five weeks). Or, the values used as a part of the statistical analysis can be the last predetermined number of estimations (e.g., the last five-hundred (500) estimations starting from the most-recent and going backward in time). Other conditions can be used as selecting those values that are to be used as a part of the statistical analysis.

The camera alignment information includes a representative yaw angle, a representative pitch angle, and a representative roll angle. In one embodiment, the mean value of each of the three angles is selected as the representative angle that is a part of the camera alignment information. For example, the average yaw angle of the estimation history can be selected as the representative yaw angle. The same can be said for the pitch angle and the roll angle. The process 230 may then end.

With reference to FIG. 4, there is shown a non-limiting example of a yaw/pitch estimation process 324. The process 324 begins with step 410 wherein an initialization process is carried out. The initialization process (sometimes referred to as an initialization stage) includes estimating an initial relative camera pose. This can include obtaining two image frames from the image data, then extracting and matching features between the two frames, and, finally, triangulating the matched features from these two frames so as to obtain the initial relative camera pose. An exemplary initialization process for obtaining the initial relative camera pose is discussed below. It should be appreciated that the term relative camera pose refers to the temporal pose, which pertains to the rotation and translation that describe the relation between camera positions over time.

Step 412, which is a part of step 410, is used to identify (or extract) and match a plurality of features between the two frames. The plurality of features are points of interest that are present within an image frame. The features can be identified using various techniques, and can be identified based on certain properties, such as those features (or pixel locations) that represent an edge, a corner, a line, a particular unique pattern, etc. The identified features can be represented by certain information (referred to as "feature descriptors") that can be used to identify the same feature in another image frame, such as RGB and position information. The feature descriptors can include any one or more of a variety of feature descriptors used in the field, such as SURF, KAZE, AKAZE, ORB, BRISK, FREAK, etc. The identified features can also be assigned a unique identifier. This unique identifier, the feature descriptor, and their location (e.g., pixel coordinate) can be saved along with this unique identifier.

The identified features of the first image frame are matched to corresponding features of a second image frame. In one embodiment, for each of the identified features, the feature descriptor is used to identify portions within the second image frame that correspond to the feature of the first image frame. In other embodiments, the step 412 can be carried out for two (or more) image frames, and then the feature descriptor can be compared to identify corresponding or matching features. These matched features can be used to track movement of the identified features between frames, and this tracked movement for each feature can be referred to as a tracklet. The tracklets are then used along with the sensor data to identify movement of features with respect to the vehicle, which can then be used to obtain the yaw misalignment estimate and the pitch misalignment estimate of the camera capturing the image data using structure from motion techniques, for example. In one embodiment, whenever a feature matching step is carried out (e.g., step 412, step 430, step 530), a RANSAC matching algorithm can be used to remove outliers. After features are identified in the first image frame, step 414 is carried out.

Step 414, which is also a part of step 410, is used to determine an initial relative camera pose based on triangulating the matched features. A triangulation technique can be used to determine a point in three-dimensional space in which the identified feature is located through triangulating this point based on the locations (e.g. pixel coordinates) within the image frames having the matching features. The triangulation can be carried out for a plurality of matched features to provide a relative camera pose that is used as the initial relative camera pose. After the initial relative camera pose is obtained, the process 324 continues to step 420.

The steps 420-450 can be carried out numerous times so as to obtain a plurality of relative camera poses. Each iteration of these steps can begin with selecting a new image frame from the frame window, and can be carried out until the last image frame of the frame window is processed using steps 420-450. For each iteration, a relative camera pose can be estimated based on the present image frame and the previous image frame. The steps 420-450 can implement structure-from-motion (SfM) techniques to obtain three-dimensional information of the environment (e.g., the road behind the vehicle) using the sensor data along with a feature matching technique.

In step 420, a plurality of features are identified within an image frame of the image data. This step is similar to the identifying portion of step 412 discussed above, and that discussion is incorporated herein and not repeated for purposes of brevity. In one embodiment, these features can be those of a previous iteration (and matched in step 430), and/or may be newly identified features. The process 324 continues to step 430.

In step 430, the identified features of a first image frame are matched to features of a second image frame. This step is similar to the matching portion of step 412 discussed above, and that discussion is incorporated herein and not repeated for purposes of brevity. The process 324 proceeds to step 440.

In step 440, a three-dimensional to two-dimensional (3D-to-2D) projection mapping technique is used to determine a relative camera pose. In at least some embodiments, a perspective n-points (PnP) technique or algorithm is used to map a set of n three-dimensional points and a two-dimensional image projection to obtain a relative camera pose. The PnP technique can also use intrinsic camera parameters, including focal length, camera principal point, lens distortion parameters, image sensor format (e.g., shape and size of image sensor), etc. The 3D-to-2D projection mapping technique can be carried out using those features that were mapped to a three-dimensional point using the triangulation technique (in a previous iteration of the process 324 or as a part of the initialization process 410). The relative camera pose can be added to a set of relative camera poses represented by $\{R_i, C_i\}$, where i is the relative camera pose index, $R_i$ represents the relative rotation, and $C_i$ represents the camera center location. Once the relative camera pose is obtained, the process 324 continues to step 450.

In step 450, a three-dimensional location for each of the matched features is determined by using a triangulation technique. As mentioned above, the triangulation technique is used to determine a point in three-dimensional space in which the identified feature is located based on the locations (e.g. pixel coordinates) within the image frames of the corresponding features. The sensor data (and, in a particular embodiment, the speed data) can be used to inform the triangulation technique of a three-dimensional scale, which can be used to determine distances and rates of movement of the tracklets. This step can include determining a three-dimensional point for those points in which a three-dimensional point was already calculated based on two (or more) other previous image frames (other than the current image frame). Also, this step can include determining a three-dimensional point for newly-matched features, which are those features that were first matched in step 430. Once a three-dimensional location (or a three-dimensional point) of the identified features (or tracklets) are determined, the process 324 continues to step 460.

In step 460, the relative camera poses (of the set of relative camera poses) can be refined or optimized so as to minimize the reprojection error. The set of relative camera poses, which contains a plurality of relative camera poses, are determined using the steps 410-450. However, there may be errors that exist due to, for example, varying estimates of the three-dimensional points of the matched features. In at least some embodiments, this step is carried out once for each frame window 314, and after steps 410-450 are carried out. In many embodiments, this step includes using a local bundle adjustment technique to adjust the relative camera poses to minimize the reprojection error, which can be carried out using a cost function. Other refining and/or optimization techniques can be used as well. The method 324 continues to step 470.

In step 470, a pitch misalignment estimate and a yaw misalignment estimate are determined based on the (refined) relative camera poses and the sensor data. For each of the relative camera poses, the tangential velocity of the vehicle is obtained and used to calculate a three-dimensional rotation matrix that is used to align the camera boresight with the tangential velocity of the vehicle. For each relative camera pose i, the tangential velocity direction vector $V_i$ is calculated as $V_i = C_i - C_{i-1}$, where $C_i$ is camera center location. Then, a partial rotation matrix $R_{pitch+yaw}$ is determined based on this tangential velocity direction vector, which transforms the z axis (or camera boresight) of the camera to be aligned with V. Each of the relative camera poses can be associated with a time, which can correspond to the time of the image frame for which the steps 420-450 are to be carried out, or other suitable time corresponding to the relative camera pose. The partial rotation matrix corresponds to a yaw-pitch camera pose that is aligned with respect to the vehicle with respect to the pitch angle and yaw angle. This yaw-pitch camera pose (or partial rotation matrix $R_{pitch+yaw}$) thus provides a pitch misalignment estimate and a yaw misalignment estimate, but not a roll misalignment estimate. This information pertaining to the pitch misalignment estimate and the yaw misalignment estimate can be referred to as yaw/pitch camera alignment information and can be a part of the camera alignment information. The process 324 may then end.

Figure 6B:
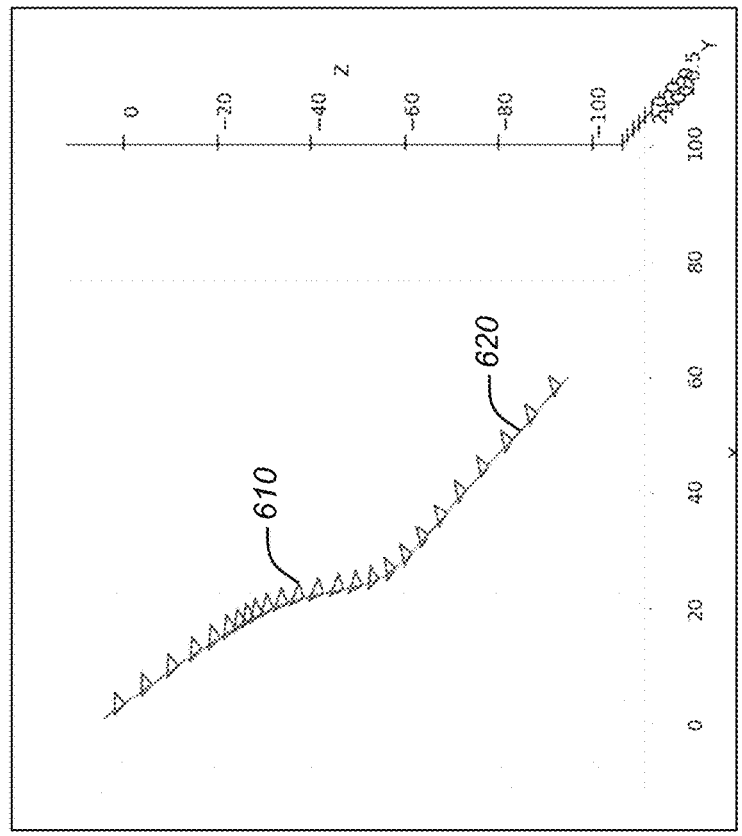
FIGS. 6A-6B depict a top-view of a vehicle trajectory and camera alignment before the image data is aligned (FIG. 6A) and after the image data (or camera boresight) is aligned with respect to the vehicle (FIG. 6B).
Figure 6A:
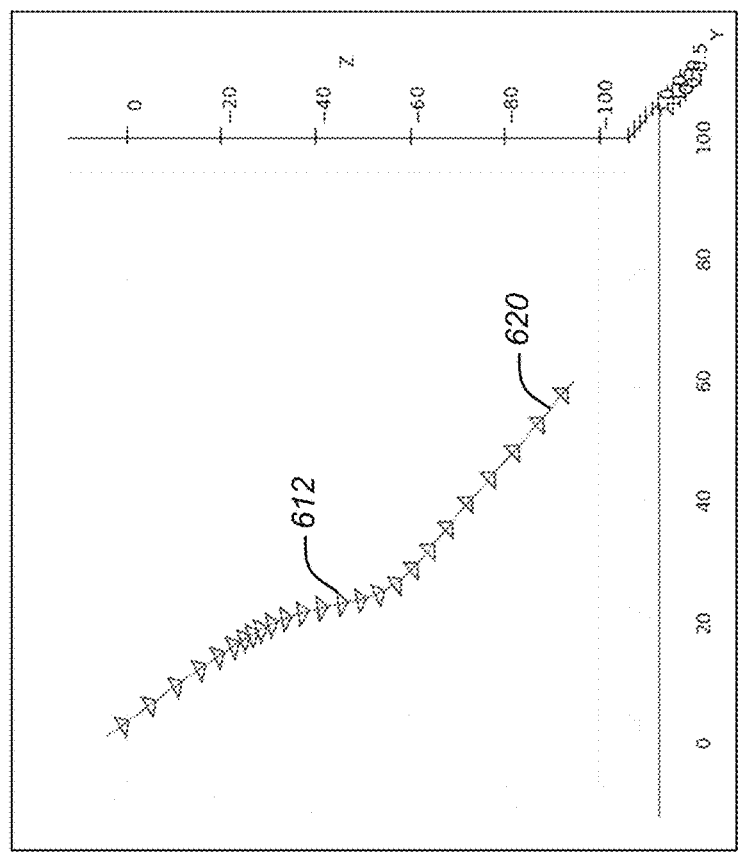

With reference to FIGS. 6A-6B, there is shown a top-view of a vehicle trajectory and camera orientation before the image data is aligned (FIG. 6A) and after the image data (or camera boresight) is aligned based on the tangential velocity (represented by the line 620) (FIG. 6B) using the process 324. The pre-aligned effective camera alignment 610 (FIG. 6A) is offset with respect to the vehicle trajectory (or tangential velocity) 620 before the alignment. However, after the alignment using the yaw misalignment estimate and the pitch misalignment estimate, the post-aligned effective camera alignment 612 (FIG. 6B) is aligned with respect to the vehicle trajectory (or tangential velocity) 620, at least with respect to the yaw angle and the pitch angle.

With reference to FIG. 5, there is shown a roll estimation process 330. The process begins with step 510 wherein a region of interest projection is constructed. The region of interest projection is a portion of the image data that corresponds to a region of interest in three-dimensional space. The region of interest in the present embodiment corresponds to a region of the road or ground on which the vehicle is travelling. The region of interest can be defined based on various parameters, such as the distance from the vehicle, the width of the region, etc. In one embodiment, the region of interest projection is determined using the partial rotation matrix $R_{pitch+yaw}$. In some embodiments, the partial rotation matrix $R_{pitch+yaw}$ and/or other camera alignment information (e.g., previous estimates of the roll angle, predefined portions of the camera field of view, or sensor data) can be used to obtain the region of interest projection. In other embodiments, the region of interest projection can be determined based on an initial roll estimation angle technique, which (in some embodiments) can include using a turn-based roll estimation angle technique. The vehicle path during a turn results in a curved plane with respect to fixed points along the road. The turn-based roll estimation technique can include identifying various three-dimensional locations for various points of the image data, and then use a best-fit technique to fit these points to a plane that corresponds to the rate and/or heading of the turn based on the curvature of this curved plane, for example. As a part of the turn-based roll estimation technique, the various three-dimensional locations is a collection of camera center locations ($C_i$) that are obtained during steps 410-460, such as from using a Structure-from-Motion procedure or technique that is applied on a sequence of frames. This technique assumes that the camera three-dimensional locations that are collected during vehicle turning belong to a plane which has the same orientation as the ground plane. This best-fit plane can then be used to obtain the region of interest projection since this best-fit plane provides an initial roll angle estimation. When the turn-based roll estimation is used, the partial rotation matrix or other camera alignment information from the process 324 may not be needed. In some embodiments, a combination of these techniques can be used. The process 330 continues to step 520.

The steps 520-550 can be carried out numerous times so as to obtain a plurality of three-dimensional points corresponding to a portion of the road and that can be used to determine an estimated roll angle based on a plane fitting technique (step 560). Each iteration of these steps can begin with selecting a new image frame 316 from the frame window 314, and can be carried out until the last image frame of the frame window is processed using steps 520-550. For each iteration, three-dimensional points corresponding to a portion of the road can be estimated based on the present image frame and the previous image frame.

In step 520, a plurality of road features are identified and extracted within a first image frame of the image data. The road features are similar to the features used in the yaw/pitch estimation process 324 (FIG. 4), but are features that are within the region or interest projection that is defined as corresponding to (or being located on) the road and/or the ground. Each of these road features are represented by a two-dimensional point (e.g., pixel location) within the first image frame. The process 330 continues to step 530.

In step 530, an optical flow technique is used to match the plurality of road features between a first image frame and a second image frame. In effect, this step is similar to the matching steps discussed with respect to the process 324 in the sense that features of multiple image frames are matched to one another. However, in at least one embodiment, an optical flow technique is used. An example of an optical flow technique can be found in Jean-Yves Bouguet. Pyramidal Implementation of the Lucas Kanade Feature Tracker Description of the algorithm. Intel Corporation, 2001. In other embodiments, other feature tracking/matching techniques can be used. Once a set of matched road features is obtained using the optical flow technique (or other suitable technique), the process 330 continues to step 540.

In step 540, the set of matched road features is filtered. The set of matched road features can be filtered to obtain a set of road features based on vehicle trajectory information (e.g., vehicle heading as obtained as a part of the sensor data), epipolar constraints, and homography constraints. The epipolar constraints can be used to ensure that the matched road features are determined based on the relative camera poses that are estimated in steps 410-460, which can use Structure-from-Motion technique(s) to estimate these relative camera poses. In some embodiments, other information pertaining to the estimated yaw-pitch camera pose (e.g., the yaw/pitch misalignment estimates) generated as a result of the process 324 can be used for filtering the set of matched road features. The homography constraint can be used to filter the set of matched road features so that those matched features that are a part of a single (or common) three-dimensional plane are selected. In step 560, a plane fitting technique is used, and so this filtering step can be used to select those matched features (which correspond to a three-dimensional point in space) that are along this single (or common) three-dimensional plane. This set of matched road features that are filtered can be referred to as a filtered set of matched road features. The process 330 continues to step 550.

In step 550, a triangulation technique is used to obtain a three-dimensional point for each of the filtered set of matched road features. The triangulation technique can be used to determine a three-dimensional location of each road feature represented by within the filtered set of matched road features. This triangulation step can include using the relative camera pose so as to constrain the number of possibilities produced as a result of the triangulation. Various triangulation techniques can be used, such as those discussed above with respect to step 450. The process 330 then continues to step 560.

In step 560, a roll misalignment estimate is obtained based on fitting the three-dimensional points to a ground plane. The three-dimensional points each correspond to a road feature and, thus, fitting these points to a plane in three-dimensional space produces an estimate of the ground plane (or a plane corresponding to the road). Various plane fitting techniques can be used, such as those that seek a best-fit ground plane that produces the smallest mean-squared between as measured between the three-dimensional points and the plane. A roll misalignment estimate can then be obtained by determining the roll angle between the ground plane as observed in the image and as taken with respect to the vehicle frame of reference. Information pertaining to the roll misalignment estimate can be referred to as roll camera alignment information and can be a part of the camera alignment information. The process 330 may then end.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

What is claimed is:

1. A method of aligning image data from a vehicle camera, the method comprising the steps of:
    obtaining image data from the vehicle camera installed on a vehicle;
    obtaining sensor data from one or more vehicle sensors installed on the vehicle;
    carrying out a yaw/pitch estimation process to obtain yaw/pitch camera alignment information that includes a yaw misalignment estimate and a pitch misalignment estimate, wherein the yaw/pitch estimation process uses the image data and the sensor data to determine three-dimensional points of identified features within two or more image frames of the image data when obtaining the yaw/pitch camera alignment information;
    after the yaw/pitch estimation process, carrying out a roll estimation process to obtain roll alignment information that includes a roll misalignment estimate, wherein the roll estimation process includes using the yaw/pitch camera alignment information when obtaining the roll alignment information and the roll estimation process includes constructing a region of interest projection by projecting a region of interest in three-dimensional space to the region of interest projection, in two-dimensional space, that corresponds to a portion of the image data; and
    applying camera alignment information to the image data to obtain aligned image data, wherein the camera alignment information includes information based on the yaw/pitch camera alignment information, the roll alignment information, or both.

2. The method of claim 1, further comprising the step of:
    determining whether predefined conditions are satisfied before any of the carrying out steps.

3. The method of claim 1, wherein the obtaining image data step further comprises providing the image data to a vehicle video processing module.

4. The method of claim 3, wherein the obtaining sensor data step further comprises providing the sensor data to the vehicle video processing module.

5. The method of claim 4, wherein at least one of the obtaining steps further comprises pre-processing.

6. The method of claim 1, wherein the carrying out steps are performed a plurality of times for each time the applying step is performed.

7. The method of claim 1, wherein the method further comprises obtaining the two or more image frames from a frame buffer, wherein the two or more image frames are defined by a frame window.

8. The method of claim 7, wherein the method further comprises
    synchronizing the two or more image frames to the sensor data, and wherein a time indicator of the sensor data corresponds to a time indicator of the two or more image frames and/or the frame window.

9. The method of claim 1, wherein the yaw/pitch estimation process includes identifying a plurality of features of a first image frame of the image data and then matching each of the identified features of the first image frame to a corresponding feature of a second image frame of the image data to obtain a plurality of matched features.

10. The method of claim 9, wherein the yaw/pitch estimation process includes determining a relative camera pose based on the plurality of matched features.

11. The method of claim 10, wherein the yaw/pitch estimation process includes determining a three-dimensional location for each of the plurality of matched features by using a triangulation technique.

12. The method of claim 11, wherein the yaw/pitch estimation process includes carrying out the identifying step, the matching step, and the determining step to determine a plurality of relative camera poses.

13. The method of claim 12, wherein the yaw/pitch estimation process includes refining the plurality of relative camera poses using a local bundle adjustment technique.

14. The method of claim 1, wherein the region of interest corresponds to a region of the road or ground on which the vehicle is travelling.

15. The method of claim 14, wherein the roll estimation process includes identifying a plurality of features within the region of interest projection of a first image frame of the image data and matching the identified features to corresponding features of a second image frame of the image data to obtain a set of matched road features, wherein an optical flow technique is used to match the identified features of the first image frame and to the corresponding features of the second image frame.

16. The method of claim 15, wherein the roll estimation process includes filtering the set of matched road features, wherein the set of matched road features is filtered based on vehicle trajectory information, epipolar constraints, and/or homography constraints to obtain a filtered set of matched road features.

17. The method of claim 16, wherein the roll estimation process includes using a triangulation technique to obtain a three-dimensional point for each of the filtered set of matched road features, and obtaining the roll misalignment estimate based on fitting the three-dimensional points to a ground plane.

18. A method of aligning image data from a vehicle camera, the method comprising the steps of:
    obtaining image data from the vehicle camera installed on a vehicle;
    obtaining sensor data from one or more vehicle sensors installed on the vehicle;
    carrying out a yaw/pitch estimation process to obtain a yaw misalignment estimate and a pitch misalignment estimate, wherein the yaw/pitch estimation process includes:
        identifying a plurality of features of a first image frame of the image data and then matching each of the identified features of the first image frame to a corresponding feature of a second image frame of the image data to obtain a plurality of matched features;

determining a three-dimensional location for each of the plurality of matched features by using a triangulation technique;

using a three-dimensional to two-dimensional (3D-to-2D) projection mapping technique to determine a relative camera pose based on the three-dimensional locations;

carrying out the identifying, determining, and using steps a plurality times to obtain a set of relative camera poses; and determining the yaw misalignment estimate and the pitch misalignment estimate based on the set of relative camera poses and the sensor data;

after the yaw/pitch estimation process, carrying out a roll estimation process to obtain a roll misalignment estimate, wherein the roll estimation process includes constructing a region of interest projection by projecting a region of interest in three-dimensional space to the region of interest projection, in two-dimensional space, that corresponds to a portion of the image data; and applying camera alignment information to the image data to obtain aligned image data, wherein the camera alignment information includes the yaw misalignment estimate, the pitch misalignment estimate, and the roll misalignment estimate.

19. The method of claim 18, wherein the region of interest corresponds to a region of the road or ground on which the vehicle is travelling; and the roll estimation process includes:

identifying a second plurality of features within the region of interest projection of an image frame and matching the identified features to corresponding features of another image frame to obtain a set of matched road features;

filtering the set of matched road features, wherein the set of matched road features is filtered based on constraints, wherein the constraints are obtained based on the yaw misalignment estimate and the pitch misalignment estimate.

20. A vehicle image alignment system, comprising:
a vehicle camera installed on a vehicle;
one or more vehicle sensors installed on the vehicle; and
a vehicle video processing module that includes a processor and a non-transitory, computer-readable memory accessible by the processor, wherein the non-transitory, computer-readable memory includes computer instructions;

wherein when the processor of the vehicle video processing module executes the computer instructions, the vehicle alignment system:

obtains image data from the vehicle camera;

obtains sensor data from the one or more vehicle sensors;

carries out a yaw/pitch estimation process to obtain yaw/pitch camera alignment information that includes a yaw misalignment estimate and a pitch misalignment estimate, wherein the yaw/pitch estimation process uses the image data and the sensor data to determine three-dimensional points of identified features within two or more image frames of the image data when obtaining the yaw/pitch camera alignment information;

after the yaw/pitch estimation process, carries out a roll estimation process to obtain roll alignment information that includes a roll misalignment estimate, wherein the roll estimation process includes using the yaw/pitch camera alignment information when obtaining the roll alignment information and the roll estimation process also includes constructing a region of interest projection by projecting a region of interest in three-dimensional space to the region of interest projection, in two-dimensional space, that corresponds to a portion of the image data; and applies camera alignment information to the image data to obtain aligned image data, wherein the camera alignment information includes information based on the yaw/pitch camera alignment information, the roll alignment information, or both.

* * * * *